United States Patent Office 2,746,813
Patented May 22, 1956

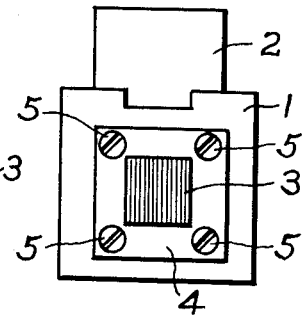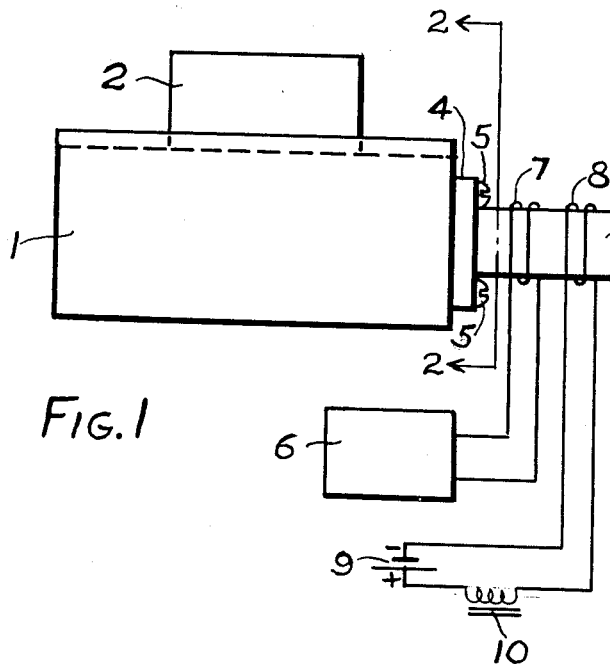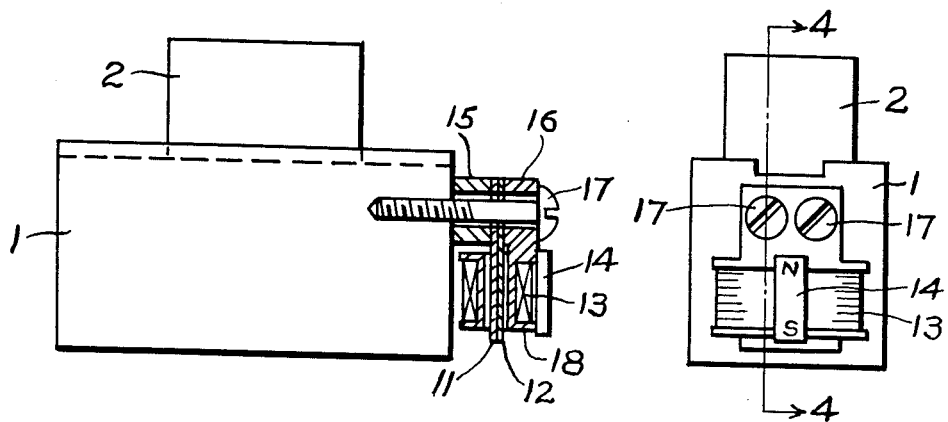

2,746,813

MEANS FOR REDUCING STATIC FRICTION

Frank Massa, Braintree, Mass.

Application November 16, 1951, Serial No. 256,735

9 Claims. (Cl. 308—1)

My invention is concerned with means for reducing static friction between two surfaces which are adapted to have relative motion between them. My invention may be applied to bearings and shafts but it is of particular advantage in reducing the starting friction of a reciprocating carriage which slides over guides such as are commonplace in many machine tools.

In high precision machine tools such as a precision grinder, for example, the ultimate accuracy of the machine is limited by the smoothness with which the moving carriage may be started as it is reversed in direction at the end of each stroke. Previous attempts to reduce the starting friction of the carriage have included the use of ball or roller bearings but this method possesses the disadvantage of requiring that the carriage load is carried on the very small areas of the balls or rollers which causes varying deflections of the loaded carriage, which, in turn, introduces errors in the position of the work when a precision of the order of tenths of thousandths of an inch is required in the tolerance of the fabricated part. The use of V-ways and flat ways are almost universally employed in precision machine tools to permit a solid rigid support of the carriage.

Another earlier attempt to reduce the starting friction of the carriage has consisted of imparting a low-frequency mechanical vibration to the bed on which the ways are mounted or imparting the vibration to the carriage itself. The source of vibration has in some cases consisted of a buzzer which was bolted to the machine and was operated by the 60-cycle power line to generate mechanical vibrations of 60 or 120 cycles per second. These low-frequency vibrations were effective in reducing the static friction of the sliding parts; however, the amplitude of vibration necessary was too great to permit its use in high precision machines.

The basic principle used in my invention, which overcomes the previous difficulties, is to employ high-frequency compressional waves to reduce the static friction between two smooth surfaces. By using high-frequency waves, a high oscillatory velocity can be established between the two smooth mating parts without the necessity for using large amplitudes. By using frequencies in the ultrasonic range, it is possible to employ amplitudes much less than one-tenth of a thousandth of an inch to result in a very great reduction in the static friction without impairing the precision of a machine that is designed for accuracies of the order of one-tenth of a thousandth of an inch.

An object of my invention is to reduce the static friction between two surfaces.

Another object of my invention is to efficiently introduce high-frequency compressional waves into a solid body for the purpose of reducing the friction between the surface of the body and a second body which is designed to move in relation to it.

A further object of my invention is to impart high-velocity, low-amplitude oscillatory vibrations at the interface of two mating smooth surfaces so that the static friction is very greatly reduced while the resulting displacement produced at the interface is less than one-tenth of a thousandth of an inch.

Another object of my invention is to greatly reduce the static friction between the guide surfaces of a carriage and the mating surfaces of its bed in a machine tool to improve the precision with which the machine is able to finish a part.

The novel features that I consider characteristic of my invention are set forth with particularity in the appended claims. The invention, itself, however, both as to its organization and method of operation, as well as additional objects and advantages thereof, will best be understood from the following description of several embodiments thereof, when read in connection with the accompanying drawings, in which—

Fig. 1 is a partially schematic view showing one form of my invention.

Fig. 2 is a section taken along the line 2—2 of Fig. 1.

Fig. 3 is a partially schematic view showing a second form of this invention.

Fig. 4 is a section taken along the line 4—4 of Fig. 3.

Referring more particularly to Figs. 1 and 2, the reference character 1 represents a fixed body and 2 represents a second body that is supported by the body 1 and is capable of being moved with respect to the body 1. The force necessary to start the body 2 from its position of rest results from the coefficient of static friction between the two mating surfaces of bodies 1 and 2 and, in general, is a fairly large percentage of the weight of body 2. In addition, the static friction is usually erratic in nature so that successive starts of body 2 will require different amounts of force which, in turn, results in "jerky" starts which is very objectionable when body 2 happens to be a carriage in a high precision machine tool in which the carriage feed is desired to be very accurately controlled. I have found it possible to reduce the friction between two bodies by a very large factor, amounting to less than $\frac{1}{10}$ of the original friction between the two smooth clean dry surfaces, by introducing high-frequency compressional waves into one of the two bodies. One manner in which I accomplish this is by employing a magnetostriction oscillator 3 as a high-frequency compressional wave generator which is bonded by silver solder or other suitable means to the face plate 4. Both the surface of the face plate 4 and the end surface of the member 1 to which it is attached are ground flat to secure intimate acoustic coupling of the two parts. I have found it desirable to employ a thin film of grease between the two surfaces to improve the intimacy of contact before attaching plate 4 to the member 1 by means of the screws 5. The magnetostriction oscillator 3 may be any one of several designs well known in the art. In this case, I have shown the structure as a stack of thin laminations of magnetostrictive material such as nickel but the compressional wave generator could be of any other well-known form. An electronic power supply 6 is indicated schematically in Fig. 1 for supplying alternating current to the coil of wire 7 which surrounds the magnetostriction oscillator 3. A second coil 8 also surrounds the oscillator 3 and is connected to the battery 9 to serve as a D.-C. polarizing source for the nickel stack 3. A choke 10 is placed in series with the battery 9 and coil 8 to prevent the D.-C. polarizing circuit from taking A.-C. power from coil 7. This method of exciting a magnetostriction oscillator is well-known in the art and does not form part of my invention. When the oscillator 3 is electrically excited, high-frequency compressional waves are generated in the nickel stack and are transmitted into the member 1 by virtue of the intimate contact between the face plate 4 and the end surface of the body 1 to which the face plate is attached. When these high-frequency compressional waves are established, the static friction between bodies 1 and 2 is very greatly reduced and I have found that the force necessary to start the body 2 moving in the presence of the compressional waves is in many instances less than 1/10 the force necessary to overcome the static friction in the absence of the compressional waves. I found that the frequency of the compressional waves is not critical but it is desirable to have them in the ultrasonic frequency range above 15,000 cycles per second so that no disturbing sound is caused by the compressional wave generator. I found that frequencies as low as 1000 cycles per second are satisfactory for reducing static friction without causing any disturbing vibration of the body 2. At frequencies in the audible range, however, audible sound is radiated by the structure which in some cases may be an objectionable nuisance.

Figs. 3 and 4 show another embodiment of my invention in which I employ a transversely vibrating element which is indicated as a bi-metallic magnetostriction reed 11, 12 surrounded by a coil 13. A permanent magnet 14 supplies the polarizing flux for the elements 11, 12 and when a source of A.-C. current is sent through the coil 13 the bi-metallic element will oscillate. The bi-metallic element consists of a positive magnetostriction strip 11 and a negative magnetostriction strip 12 welded together as a single reed. When current flows through the coil 13 in one direction, the element 11 expands while element 12 contracts, which results in the bending of the reed. This bending alternates with the alternation of the A.-C. current through the coil 13. This type of structure is described more completely in Patent #2,475,148. The base of the reed 11, 12 is clamped between a flat plate 15 which is preferably non-magnetic and the flat base portion 16 of a molded coil form whose spool-shaped portion 18 carries the winding for the coil 13. The opening through the spool portion 18 has sufficient clearance to permit the free oscillation of the bi-metallic reed 11, 12, when the coil 13 is supplied with A.-C. current. The magnet 14 is cemented to the outer surface of the coil form in the position shown in Figs. 3 and 4. The screws 17 are employed to firmly attach the assembly to the body 1. As in the previous arrangement of Fig. 1, it is important that the surfaces of the plate 15 and the end face of member 1 be smooth and flat to secure good acoustic coupling for permitting efficient transmission of compressional wave energy from the reed 11, 12 to the body 1. When A.-C. current passes through the coil 13, oscillations of the reed 11, 12 will cause compressional waves to be transmitted through the clamped base portion into the body 1 and the presence of these waves in body 1 will cause the static friction between parts 1 and 2 to be considerably reduced.

Although I have only shown two different types of compressional wave generators and two methods of transmitting the wave energy into a solid member, it is, of course, possible to employ any of numerous other types of generators, including piezo-electric or electromagnetic compressional wave generators which are also well-known in the art. The basic requirements are that the compressional wave generator be of a high-frequency type and that it be intimately coupled to the solid body in which the energy is to be transmitted.

Although I have only mentioned a few applications of my invention to illustrate my new means for reducing static friction, it will be obvious to those skilled in the art that numerous other applications may be made for my invention, and I, therefore, desire that my invention shall not be limited except insofar as is made necessary by the prior art and by the spirit of the appended claims.

I claim as my invention:

1. In combination, a first solid body having a smooth surface, a second solid body having a smooth surface which mates with the smooth surface on the first body, the said two bodies being adapted so that relative motion may be established between said two smooth mating surfaces, a compressional wave generator intimately attached to one of said bodies and adapted to transmit oscillatory vibrations whose direction of propagation is parallel to the direction of motion established between said bodies, said compressional wave generator being capable of transmitting compressional waves of a frequency greater than 1000 cycles per second into said body whereby the static friction between said two smooth surfaces is reduced.

2. In combination, a first solid body having a smooth surface, a second solid body having a smooth surface which mates with the smooth surface on the first body, the said two bodies being adapted so that relative motion may be established between said two smooth mating surfaces, an ultrasonic compressional wave generator intimately attached to one of said bodies, said compressional wave generator being capable of transmitting compressional waves into said body whereby the static friction between said two smooth surfaces is reduced.

3. In a machine, a bed member, a guide member associated with said bed member, a carriage member, a positioning member associated with said carriage member and adapted to accurately locate said carriage member on said guide member, means for sliding said carriage member over said bed member, and a compressional wave generator intimately attached to any one of said members for the purpose of transmitting compressional waves into said member whereby the static friction between the sliding surfaces of said carriage and bed members is reduced, the amplitude of said compressional waves being less than approximately .0001".

4. In a machine, a bed member, a guide member associated with said bed member, a carriage member, a positioning member associated with said carriage member and adapted to accurately locate said carriage member on said guide member, means for sliding said carriage member over said bed member, and a compressional wave generator intimately attached to any one of said members for the purpose of transmitting compressional waves of a frequency greater than 1000 cycles per second into said member whereby the static friction between the sliding surfaces of said carriage and bed members is reduced.

5. In a machine, a bed member, a guide member associated with said bed member, a carriage member, a positioning member associated with said carriage member and adapted to accurately locate said carriage member on said guide member, means for sliding said carriage member over said bed member, and an ultrasonic compressional wave generator intimately attached to any one of said members for the purpose of transmitting compressional waves into said member whereby the static friction between the sliding surfaces of said carriage and bed members is reduced.

6. The method of reducing static friction between a pair of solid mating bodies adapted to slide with respect to one another which includes the step of introducing oscillatory compressional waves into one of said bodies the frequency of vibration of said compressional waves lying in the region above 1000 cycles per second.

7. The method of reducing static friction between a pair of solid mating bodies adapted to slide with respect to one another which includes the step of introducing ultrasonic compressional waves into one of said bodies.

8. The method of improving the accuracy of a machine tool whose design permits holding tolerances of machined parts to the order of .0001" which machine tool includes a bed member, a guide member associated with said bed member, a carriage member, and a positioning member associated with said carriage member adapted to accurately locate said carriage member on said guide member, said method including the step of introducing oscillatory vibrations into any one of said members, said oscillatory vibrations characterized in that the frequency lies in the region above 1000 cycles per second and further characterized in that the amplitude of said vibrations are less than approximately .0001" in magnitude.

9. The invention set forth in claim 8 further characterized in that said oscillatory vibrations lie in the ultrasonic frequency region.

References Cited in the file of this patent

UNITED STATES PATENTS

| | | |
|---|---|---|
| 1,759,412 | Noble | May 20, 1930 |
| 2,070,944 | Hillix | Feb. 16, 1937 |
| 2,354,413 | Walter | July 25, 1944 |
| 2,366,162 | Vang | Jan. 2, 1945 |
| 2,441,517 | Sussman | May 11, 1948 |